United States Patent
Wang et al.

(10) Patent No.: US 10,725,514 B1
(45) Date of Patent: Jul. 28, 2020

(54) POWER MANAGEMENT FOR BACKUP BATTERY UNITS

(71) Applicant: Amazon Technologies, Inc., Seattle, WA (US)

(72) Inventors: Ligong Wang, Austin, TX (US); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 15/831,118

(22) Filed: Dec. 4, 2017

(51) Int. Cl.
  *G06F 1/26* (2006.01)
  *G06F 1/32* (2019.01)
  *G06F 1/3287* (2019.01)

(52) U.S. Cl.
  CPC .............. *G06F 1/263* (2013.01); *G06F 1/266* (2013.01); *G06F 1/3287* (2013.01)

(58) Field of Classification Search
  CPC ........ G06F 1/263; G06F 1/266; G06F 1/3287; G06F 1/26; G06F 1/32
  See application file for complete search history.

(56) References Cited

U.S. PATENT DOCUMENTS

| | | | | |
|---|---|---|---|---|
| 2014/0101462 | A1* | 4/2014 | Rose | G06F 1/263 713/300 |
| 2014/0298045 | A1* | 10/2014 | Sieber | G06F 1/263 713/300 |
| 2017/0212169 | A1* | 7/2017 | Wang | H02J 7/007 |
| 2017/0265325 | A1* | 9/2017 | Klikic | H02J 9/061 |

* cited by examiner

*Primary Examiner* — Phil K Nguyen
(74) *Attorney, Agent, or Firm* — Kilpatrick Townsend & Stockton LLP

(57) ABSTRACT

Systems for controlling cycling operations for backup battery units in a datacenter include groups of backup battery units and power supply units that can supply power to datacenter components from either a primary power supply or, the backup battery units. Each group of multiple battery units has sufficient capacity to provide backup power to a respective electronic device even when one battery unit is offline. In operation, a controller receives requests to perform cycling operations, e.g. maintenance, on the backup batteries. Upon each request, the system retrieves status information corresponding to each backup battery unit and determines whether the remainder of the backup battery units can supply sufficient power to meet or exceed power demand, and either allow or prevent each backup battery unit from performing the cycling operation in response to determining whether the remainder of the backup battery units can or cannot supply sufficient power.

20 Claims, 12 Drawing Sheets

POWER MANAGEMENT FOR BACKUP BATTERY UNITS

BACKGROUND

A datacenter typically contains a collection of computer servers and components for the management, operation and connectivity of those servers, including power management components such as automatic transfer switches or power supply units, which can direct power to electronic components from primary or backup power supplies. Although intended to improve the functionality and consistent operation of datacenter components, backup power supplies require periodic maintenance that can occasionally render such systems inadequate to protect the datacenter from power loss events.

BRIEF DESCRIPTION OF THE DRAWINGS

Various embodiments in accordance with the present disclosure will be described with reference to the drawings, in which.

DETAILED DESCRIPTION

Figure 1:
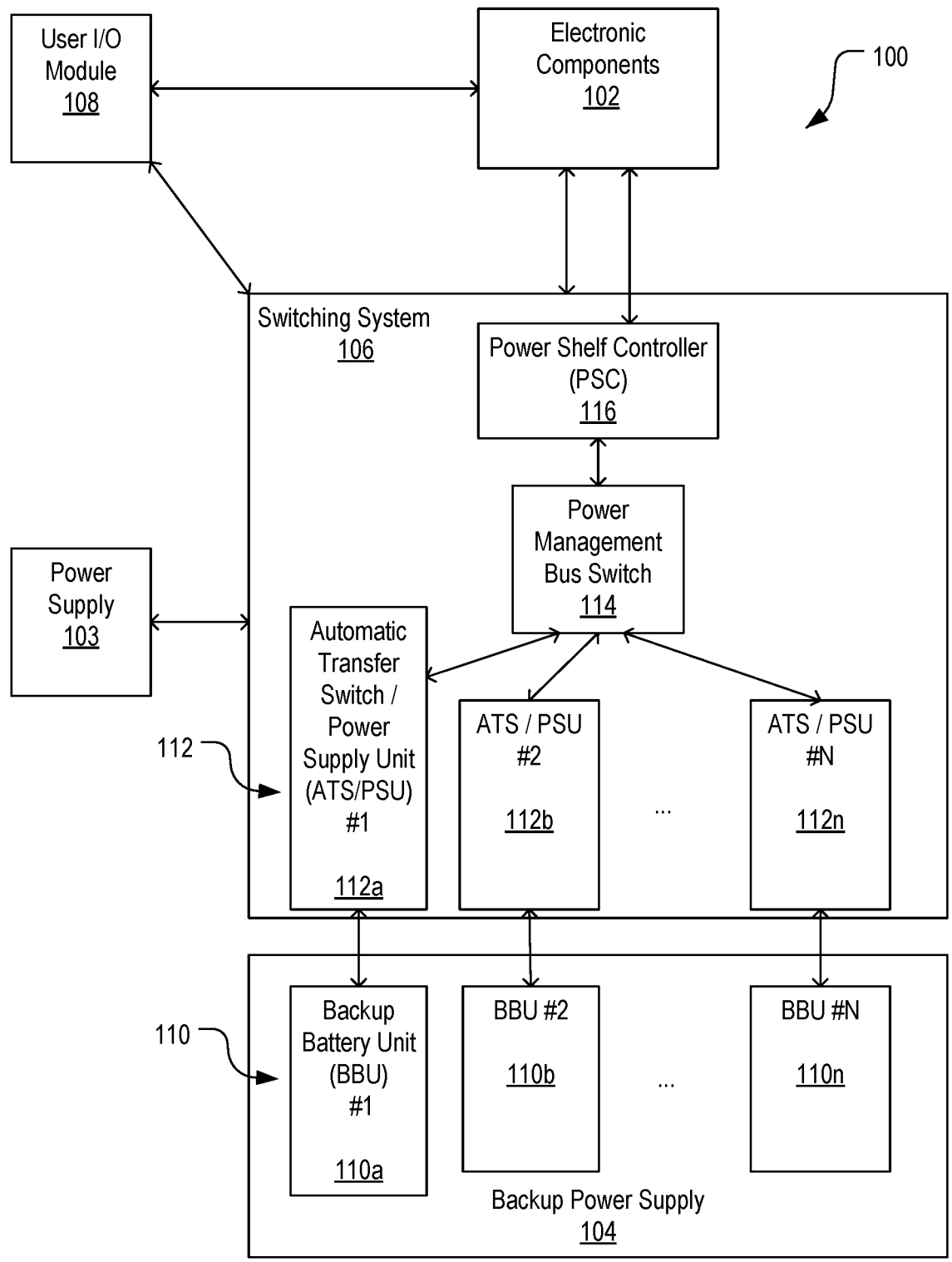
FIG. 1 is a high-level block diagram illustrating a system for powering electronic components while accommodating cycling operations on backup battery units (BBU), in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a modern datacenter, the continuity of power to servers and other computer devices can be maintained by employing redundant power supplies. In conventional systems, two or more redundant AC or DC power supplies may be used. An automatic transfer switch can be used to monitor the power supplied by a primary power supply to downstream electronics and cause a switch to a secondary power supply if the primary power supply fails. Switching is generally accomplished by causing a mechanical relay between the primary power supply and the electronics to open while another mechanical relay between the secondary power supply and the electronics is closed, although various approaches can be used for the switching operation, including solid-state approaches that do not employ mechanical relays.

In some datacenters and comparable, large-scale systems, backup power can be supplied to electronic components, including transfer switches, servers or other computing systems, or even to cooling mechanisms by battery units (i.e. backup battery units or BBU's). Such BBU's are charged periodically, intermittently, or continuously from a primary power source. The BBU's are used during a power loss event to provide a temporary power supply to any suitable electronic component, often for a short duration to allow time for secondary power generation to be activated, or for a longer duration to allow for repairs to failed power systems.

Battery-supplied backup power provides stability and flexibility to large-scale electronic systems, especially datacenter systems. However, the BBU's that enable such systems may be installed and kept charged for months or even years between each power loss event. As a result, a system employing BBU's for emergency or backup power must periodically test, condition, replace, or otherwise perform a cycling operation that takes each BBU offline for at least a short period of time in order to ensure the integrity of the backup power system.

In one conventional approach, BBU's are permitted to cycle off and on to perform self-diagnostic tests on a rolling basis. This diagnostic process can take upwards of an hour for each BBU, which results in a temporary reduction in backup power capacity when a BBU is performing a cycling operation. BBU's may be assigned to time these diagnostics based strictly on the duration since the last test and/or based on the generation of a random number. Such approaches are suitable when datacenters are served by small numbers of BBU's and as long as each electronic component is likely to have several BBU's concurrently providing a source of emergency power. However, as datacenters grow and as their power demands increase, the likelihood of a cascading failure increases, where such routine maintenance tasks will render the backup power supply system incapable of supplying backup power to all components of the system at any given time.

Embodiments herein described are directed to systems and methods for enabling the continuous supply of backup power to electronic components, e.g. in a datacenter or comparable facility. FIG. 1 illustrates one embodiment of a power supply system 100 that includes a power supply 103 (e.g., externally supplied alternating current power) and a backup power supply 104 including multiple BBU's 110. Each BBU (110a, 110b, 110n) is served by an automatic transfer switch and power supply unit (ATS/PSU—112a, 112b, 112n, cumulatively 112). The group of multiple BBU's 110 and multiple ATS/PSUs 112 work in concert to provide uninterruptible power to the electronic components 102.

The switching system 106, which includes the ATS/PSUs 112, receives power from the power supply 103 and relays power via the ATS/PSUs to the electronic components 102 from either the power supply or from the backup power supply 104. Collectively, the group of ATS/PSUs can all supply power to a single electronic component, or to a group of electronic components. Each group of BBU's 110 is capable of providing sufficient power to the electronic components 102 to maintain operation during a power loss event in which the power supply 103 is temporarily cut off. The number of BBU's 110, their collective capacity, and the capacity of each BBU in the group, are selected so that the group can provide sufficient power to maintain operation of the electronic components 102 even when at least one of the BBU's is offline (e.g., performing a cycling operation like a learning cycle or conditioning cycle), or when one of the BBU's has generated any exception, i.e. an indication that the BBU may be incapable of stable operation under increased load or in a critical role. For example, suitable exceptions can include, but are not limited to: when a BBU has previously failed a conditioning cycle or test cycle, when the BBU is operating outside of a voltage or power output range, when the BBU is operating outside a desired temperature range, or other suitable exception criteria. In some cases, number of BBU's and their individual capacities are selected so that at least two BBU's can be offline, or more, without decreasing the total capacity of the group of BBU's below a predetermined threshold capacity. In at least one embodiment, the total number of BBU's in each group can be six or more BBU's, where a group of five such BBU's has a total capacity sufficient to power a 12V bus at a 2.5 kw level for a minimum period of time, e.g., 3 minutes or more. In some other embodiments, for any group of 'N' BBU's, a group of 'N−1' of the BBU's have a total capacity that meets or exceeds a threshold sufficient to power a 12V bus at a 2.5 kw level for a minimum period of time, e.g. 3 minutes or more. The group of N−1 BBU's is sufficiently stable to retain at least the threshold capacity for the duration of a typical battery learning cycle, e.g., at least 2 hours, or in some embodiments at least 5 hours. In some embodiments, the group of N−1 BBU's is stable when providing power sufficient for a 12V bus at least at a 2 kW level for 3 minutes, or when providing power sufficient for the 12V bus at least at a 3 kW level for 2 minutes. In various alternative embodiments, the system for power management can operate in a 48V environment, such that the group of N−1 BBU's is stable when providing power sufficient for a 48V bus at least at a 2 kW level for 3 minutes, or when providing power sufficient for the 48V bus at least at a 3 kW level for 2 minutes.

Each BBU in a group of BBU's 110 is connected with a respective ATS/PSU of a related group of ATS/PSUs 112. The ATS/PSUs 112 can be controlled by a power management bus switch 114 under the centralized control of a control unit, e.g., a power management controller such as, but not limited to, a power shelf controller (PSC) 116 which is responsible for monitoring power demand and supply to the electronic components 102. Other suitable power management controllers can include direct BBU controllers or a master device selected from among multiple PSU's, among other devices. The PSC may pass power directly to the electronic components 102 from the ATS/PSUs 112, or may communicate with both the electronic components and the ATS/PSUs in order to facilitate the supply of power. The PSC 116 can monitor power demand by the electronic components 102 and power supply from the ATS/PSUs 112, which can include detecting power supply interruptions at the power supply 103. In some embodiments, the PSC 116 can also communicate information with users via, e.g., a user I/O module 108, which can include input and output devices (e.g. keyboards, monitors, network connections to portable devices maintained for user alerts, etc.) for providing alerts to operators of the system and for receiving instructions. The user I/O module 108 can be maintained by one or more of the electronic components 102 of the system 100.

Figure 2:
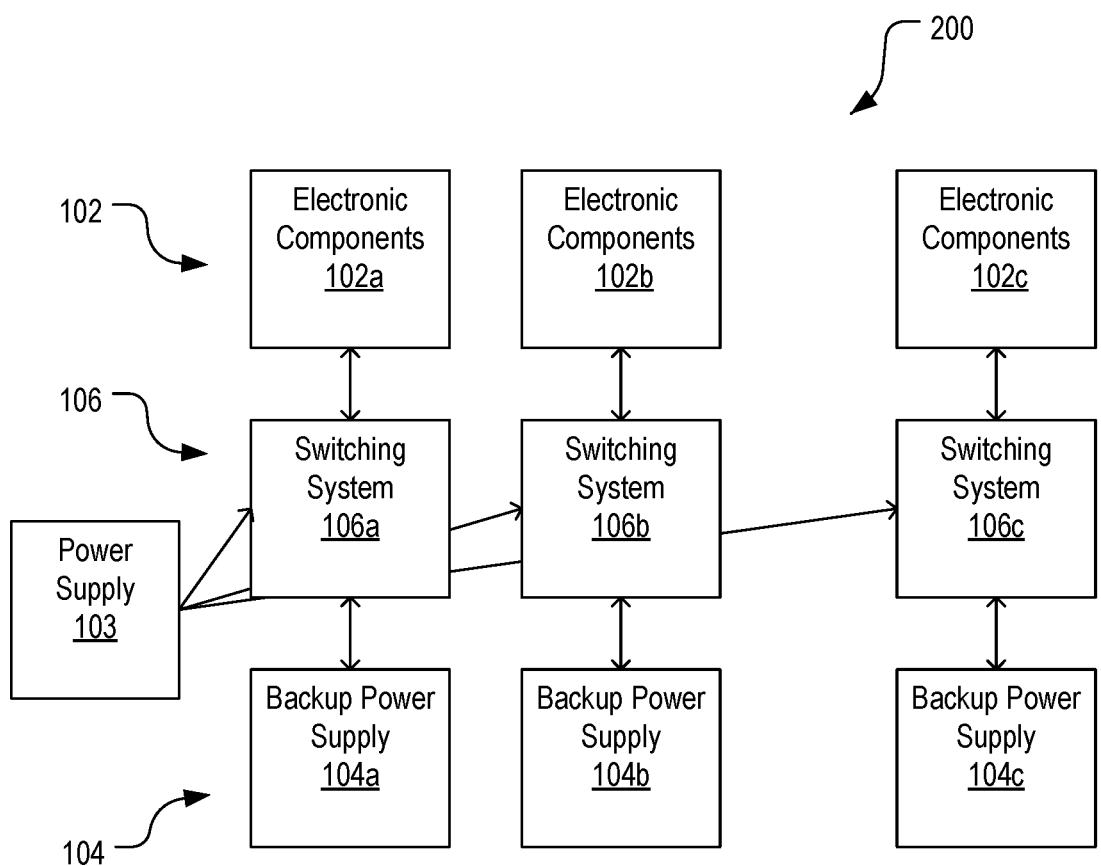
FIG. 2 is a block diagram of an example system providing power to multiple electronic components in accordance with the system of FIG. 1.

Each individual electronic component or set of electronic components 102, along with its related switching system 106 and backup power system 104, can operate in parallel with potentially many other sets of electronic components 102 and concomitant switching systems 106. FIG. 2 illustrates an example system 200 containing multiple parallel sets of electronic components 102*a-c*, switching systems 106*a-c*, and backup power supplies 104*a-c*. The architecture of this system 200 helps ensure that each set of electronic components is powered by a small subset of the total number of BBU's 110 (FIG. 1) in the system 200. Thus, the system 200 breaks up the backup power supplies 104 into potentially many discrete blocks, which can help to prevent cascading failures across multiple sets of electronic components 102 at once.

Figure 3:
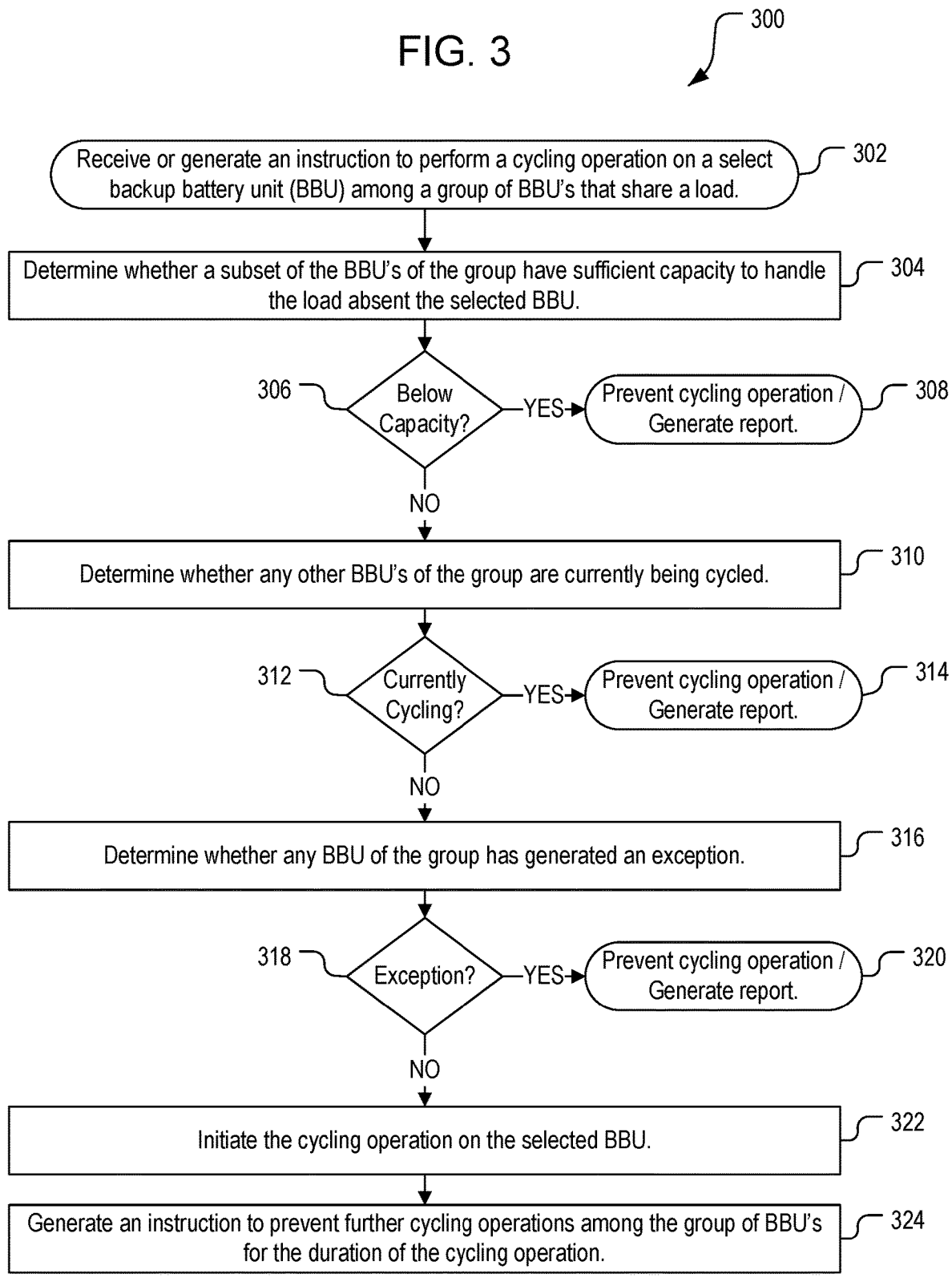
FIG. 3 is an example process for controlling a cycling operation on a BBU in a system like the systems of FIG. 1 or 2, in accordance with various embodiments.

One potential failure mode that can be prevented by the architecture of FIGS. 1 and 2 is a lack of sufficient capacity to maintain power to the electronic components 102 during a routine maintenance or conditioning cycle of the BBU's 110. For example, FIG. 3 illustrates a process 300 that uses the discrete architecture of systems 100 and/or 200 to facilitate a safe maintenance or conditioning cycle, or any other cycling operation where one of the BBU's 110 must be temporarily taken offline. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors; or may be stored in firmware or other memory associated directly with the ATS/PSUs 112, BBU's 110, PSC (116) or automatic transfer switch bus 114. The computer-readable storage medium may be non-transitory.

In the process 300, an instruction is received to perform a cycling operation on one or more of the BBU's associated with a particular set of electronic components and the switching system that routes power to them (act 302). This instruction can be timed, i.e. generated when a predetermined period of time has elapsed since the installation of a particular BBU, or since the last effective test or conditioning cycle of the particular BBU, or may be pseudo-random or generated by any other suitable criteria. The instruction can be received by the controller or master device implementing the cycling operation, or may be generated at the same device. The system can then perform a series of checks of the group of BBU's among the same group, which are enabled by the architecture and which serve to prevent the system from reducing the backup power system capacity below a minimum threshold for effectiveness.

For example, the system can detect the available capacity of each BBU among the group by selecting all BBU's currently active other than the particular BBU for which the cycling operation is requested (act 304), and compare that available capacity to a threshold representing the minimum required capacity for the backup power system. If the system determines by this comparison that the remaining BBU's would lack sufficient capacity (act 306), the system can generate an instruction to prevent the particular BBU from initiating the cycling operation, thus keeping the BBU's online and preventing the backup power system from dropping below capacity (act 308). The system can proceed to generate a report for indicating a loss of capacity, e.g. for presentation to a user or operator.

In some embodiments, the system can detect whether any other BBU among the group of BBU's is currently undergoing a cycling operation (act 310). This determination can be made by, e.g., detecting that a BBU is offline, by receiving an instruction from the system indicating that a BBU is cycling, or by querying each individual ATS/PSU and/or BBU with a status request, and subsequently receiving a reply from each respective ATS/PSU or BBU indicative of whether the BBU is online or temporarily offline. If any BBU is currently cycling (act 312), the system can proceed to generate an instruction to prevent the additional BBU from initiating a cycling operation while the first BBU is offline (314). In some cases, the system may further generate an error report for presenting to a user indicating that a BBU is currently offline and preventing the cycling operation from occurring. In some embodiments, the system can generate an instruction to delay the cycling operation while the first BBU is offline, which may include a request to repeat the initial instruction to perform the cycling operation after a period of time has elapsed, i.e. a "wait" instruction. In some other embodiments, the system can determine how much time remains until the first cycling operation will be complete, and then issue a request to begin the cycling operation after that duration has elapsed.

In some embodiments, the system can detect whether any BBU among the group of BBU's has generated an exception, e.g., failed a conditioning cycle, test cycle, or other failure criterion, or is operating outside a range of temperatures, voltages, or other comparable criterion, before proceeding to conduct the conditioning cycle (act 316). In some embodiments, an exception may also be generated based on the criticality of a task associated with an electronic device (e.g., server or the like) associated with the BBU or group of BBU's. For example, an exception may be generated to prevent cycling operations during a particular time period in which a server is known to be in high demand, e.g., a sale event for an server providing an online shopping service, a broadcast event for a server providing online streaming services, etc. This process step can be used to detect potential failure modes other that low capacity or currently cycling BBU's, or to prevent potential maintenance-related downtime during critical operations. If a failure or exception is detected (act 318), the system can proceed to prevent the additional BBU from initiating a cycling operation, and/or can generate an error report for presentation to a user indicating the detection of the exception or failure (act 320). In alternative embodiments, the system can detect failure modes in one or more of the BBU's with varying degrees of granularity, and can report failure modes with varying degrees of specificity. Furthermore, whether a cycling operation is prevented can depend on any suitable subset of the above-referenced determinations.

Once the system has determined that no suitable criterion has been met for preventing the cycling operation from occurring, (i.e. that the backup power system will function adequately absent the particular BBU for which the cycling operation has been requested,) the system can initiate the cycling operation on the selected BBU (act 322). The system can also generate an instruction to prevent further cycling operations among the group of BBU's for the duration of each cycling operation (act 324).

Various cycling operations can be conducted using this method and related methods. In at least one embodiment, the cycling operation is conducted to facilitate a conditioning cycle, where the BBU is at least partially discharged and recharged to gauge the actual capacity of the BBU or to prime each battery unit in the BBU, i.e. partially discharge each battery in order to increase performance. Conditioning cycles can include learning cycles, where a battery undergoes a controlled discharge to a predetermined threshold, followed by a rest period and recharge, and during which a battery gauge is calibrated to determine the actual capacity of the battery. These cycles can be conducted at regular intervals to monitor battery performance, or to prolong battery life. Various battery technologies can suffer temporary capacity losses during long storage, such as "memory" effects (NiCd batteries), or "passivation layer" effects (Lithium Ion batteries), among other effects. Other cycling operations can include, e.g., disconnection to allow for replacement or for the installation of new BBU's, or any other suitable operation whereby the battery is temporarily unavailable for use as a backup power supply.

Figure 4:
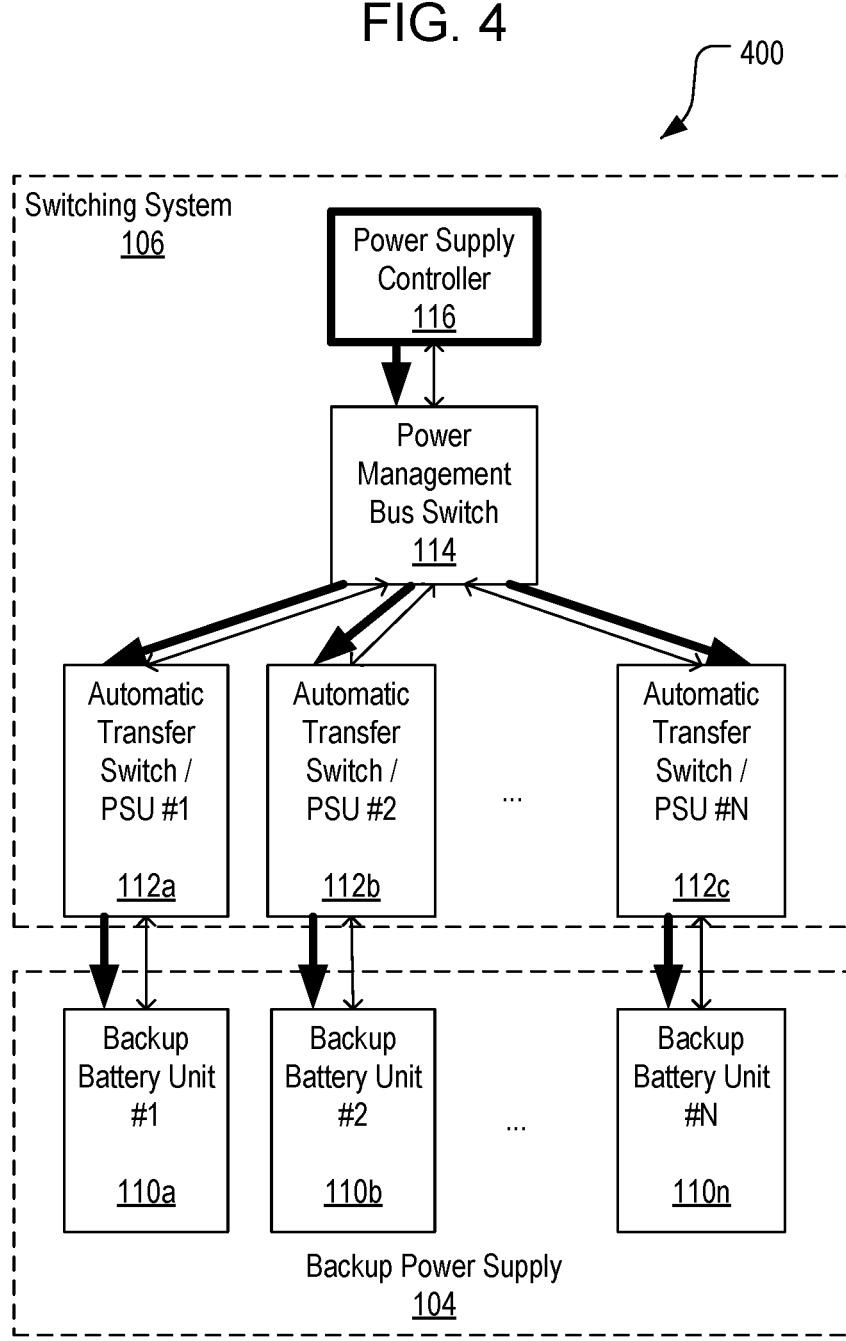
FIG. 4 is a block diagram illustrating a first approach to controlling a cycling operation on a BBU in a system like the systems of FIG. 1 or 2.

The process 300 of FIG. 3 can be conducted across various system architectures using groups of BBU's to provide power to a common load, i.e. to a common set of electronic components. However, the instructions for controlling the cycling operations can be provided according to multiple approaches. FIG. 4 is a block diagram illustrating a first approach to controlling a cycling operation on a BBU in a system like the systems of FIG. 1 or 2, in accordance with embodiments. FIG. 4 shows a first system 400 for controlling a set of BBU's 110. In the system 400, a PSC (116) is assigned to determine the timing of cycling operations, such as conditioning and learning cycles, of the set of BBU's 110 under its control. In accordance with at least one embodiment, all of the BBU's can be connected with the PSC, either directly or via a power management bus switch 114; and all of the ATS/PSUs communicate with the PSC via a common communication bus. The PSC can then control the initiation of any cycling operations, such as conditioning cycles, learning cycles, or the like, to ensure that the number of offline BBU's never exceeds a critical number (e.g., more than one offline at a time, or more than two offline at a time, etc.), and/or to ensure that the capacity of the backup battery system does not fall below a threshold due to a cycling operation.

Figure 5:
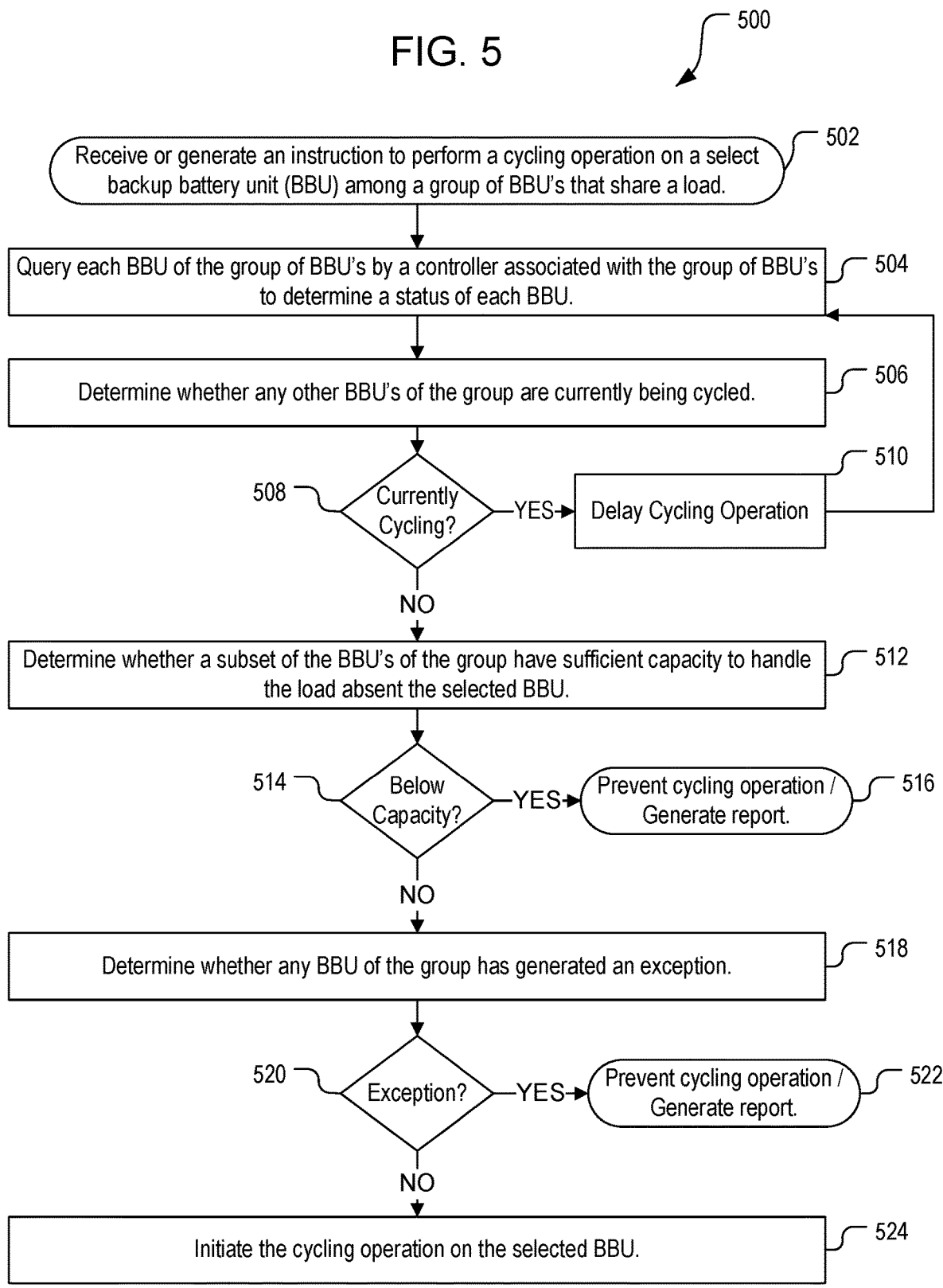
FIG. 5 is detailed process for controlling a cycling operation on a BBU in accordance with the approach of FIG. 4.

FIG. 5 illustrates the process 500 for controlling a cycling operation on a BBU in accordance with the approach of FIG. 4, and in conjunction with the systems 100, 200 shown in FIGS. 1 and 2. In the process 500, an instruction is received to perform a cycling operation (e.g. a conditioning cycle, learning cycle, or the like) on a BBU among a group of BBU's that share a common load (act 502). This instruction can be generated at the level of the BBU, at an associated ATS/PSU, or by the PSC, can be received from a user, or can be received from any other suitable source. In some embodiments, the PSC can periodically go through the BBU's according to a regular schedule to perform periodic maintenance operations.

Next, the system can determine whether any other BBU's among the group of BBU's is currently undergoing a cycling operation (act 506). If a cycling operation is ongoing (act 508), the system can delay the currently pending cycling operation for the duration of the ongoing operation (act 510).

In some embodiments, the system can determine a required period of time for the ongoing operation to conclude, and postpone the pending cycling operation upon completion of the ongoing operation. Alternatively, where the cycling operation is requested by a component (like the ATS/PSU), the system can deny the request, whereupon the requesting component can continue issuing the request until the system allows the request.

In some embodiments, the system can perform additional checks on the backup power system prior to initiating the cycling operation, as described above with reference to FIG. 3. For example, the system can proceed to determine whether the subset of BBU's excluded from the request have sufficient capacity to handle the shared load absent the particular BBU for which the request was initiated (act 512). If the system would fall below a threshold capacity (act 514), the system can generate a report for presentation to a user and/or prevent the cycling operation (act 516). Similarly, the system can determine whether a BBU of the group has previously generated an exception (act 518). If an exception is detected (act 520), the system can proceed to generate a report indicating the failure and/or prevent the cycling operation (act 522). Once the system has verified the integrity of the backup power systems, the system can initiate the cycling operation on the selected BBU (act 524).

Figure 6:
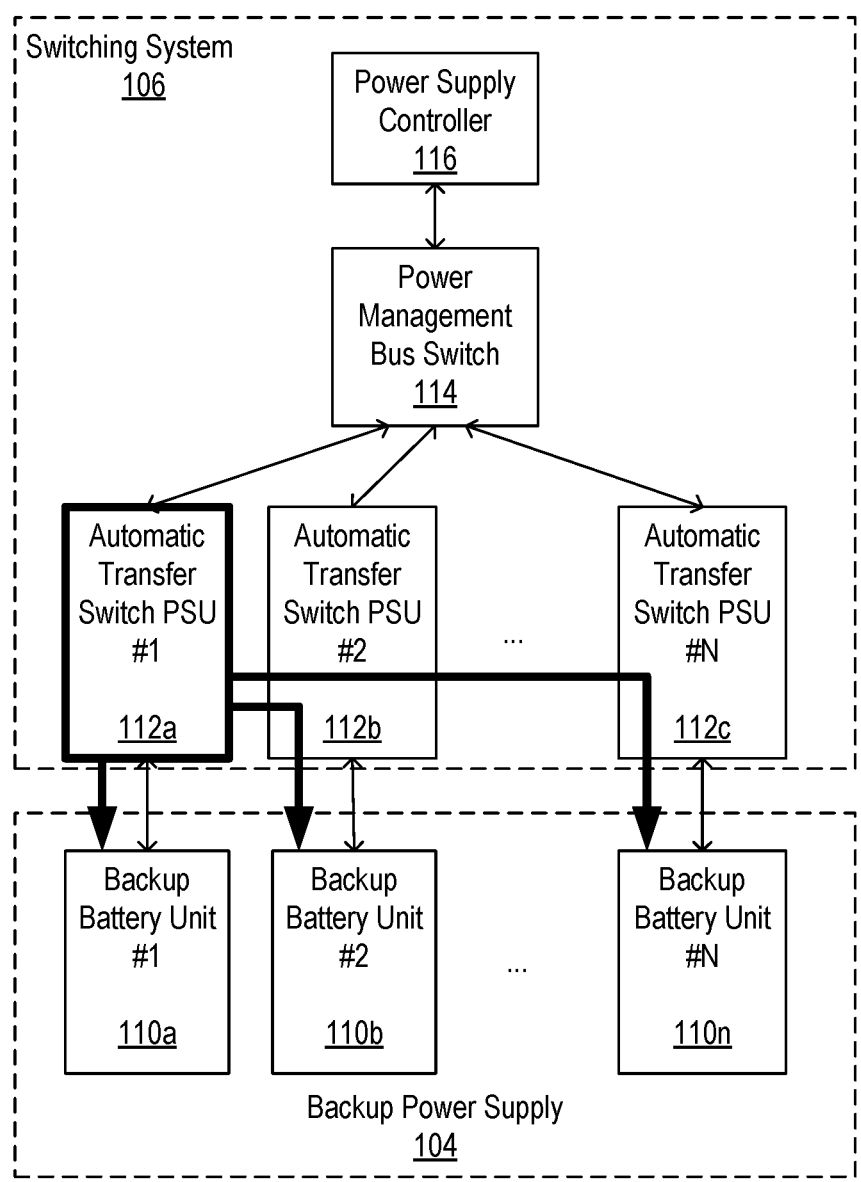
FIG. 6 is a block diagram illustrating a second approach to controlling a cycling operation on a BBU in a system like the systems of FIG. 1 or 2.

FIG. 6 is a block diagram illustrating a second approach to controlling a cycling operation on a BBU in a system like the systems of FIG. 1 or 2, in accordance with embodiments. In the system 600, an ATS/PSU is selected from among the set of ATS/PSUs controlling the group of BBU's, and acts as a master device, represented herein as ATS/PSU 112a. The master device can be selected based on any suitable criteria, e.g., by position, by the order in which the ATS/PSUs were initially connected, by a number associated with each ATS/PSU (e.g. serial number), or other method. In one embodiment, the master device can be selected by way of its position among related ATS/PSUs (i.e., its rack position), e.g. by firmware that identifies the rack position according to a resistance at the plugin location, or by other comparable method. Once a suitable ATS/PSU is selected as the master device, the master device can control the initiation of cycling operations at the BBU's among connected ATS/PSU devices in the same group in a similar manner to the PSC described with reference to FIG. 4.

Figure 7:
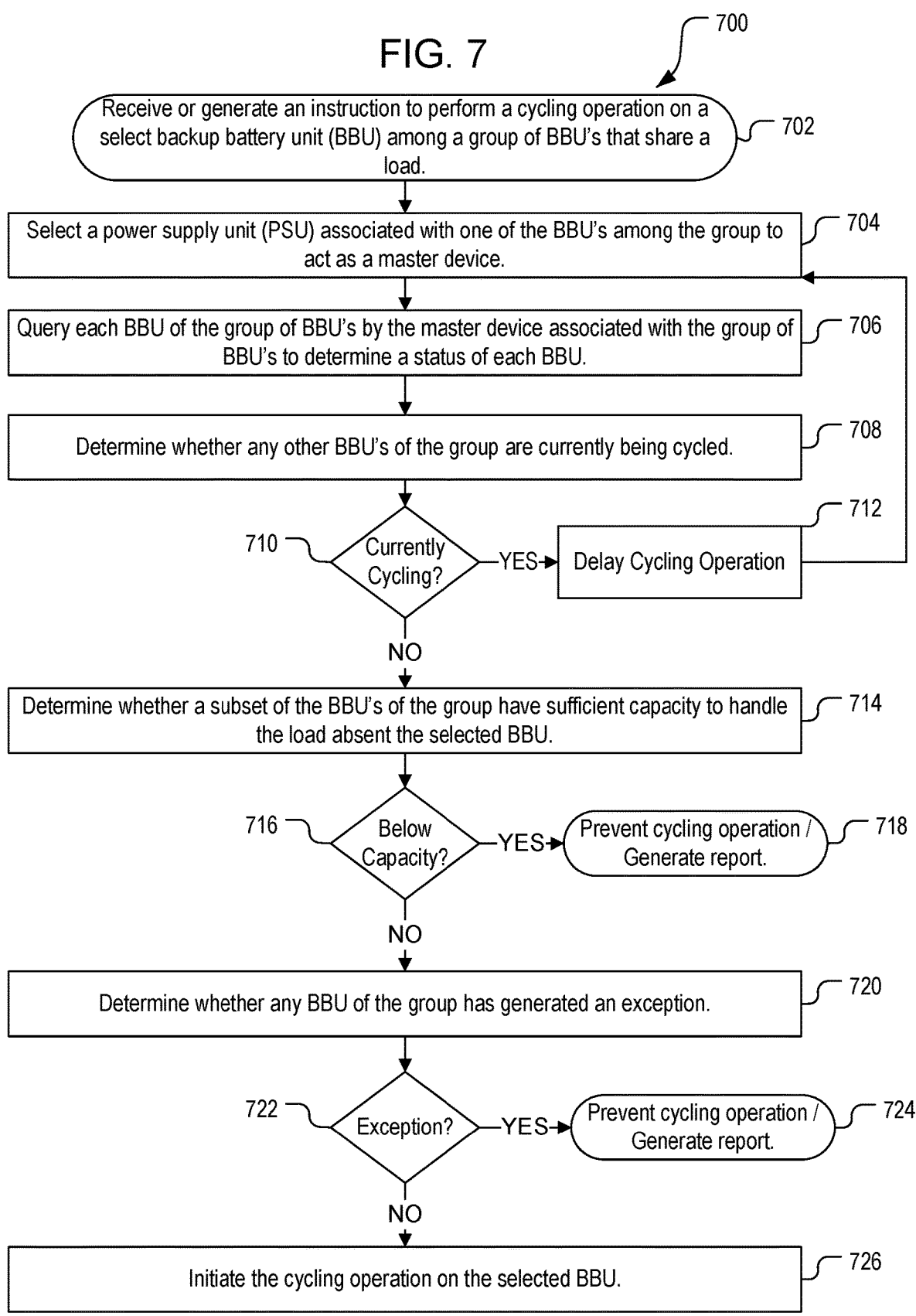
FIG. 7 is a detailed process for controlling a cycling operation on a BBU in accordance with the approach of FIG. 6.

FIG. 7 illustrates the process 700 for controlling a cycling operation on a BBU in accordance with the approach of FIG. 6, and in conjunction with the systems 100, 200 shown in FIGS. 1 and 2. In the process 700, an instruction is received to perform a cycling operation (e.g., a conditioning cycle, learning cycle, or the like,) on a BBU among a group of BBU's that share a common load (act 702). Initially, an ATS/PSU is selected from among the ATS/PSUs corresponding to the group of BBU's to act as a master device (act 704). This selection can be performed once, e.g. based on an initial selection among the ATS/PSUs at the time of installation; or can be checked when a request is initiated. The master device can then query each BBU among the group to determine a status of each BBU, where the status can include whether the BBU is currently undergoing a cycling operation, a capacity of each BBU, whether each BBU has generated an exception, e.g. by failing a conditioning cycle or comparable exception, or the like (act 706).

The process 700 can then proceed in a similar manner to process 500, in which the system performs one or more of a series of checks on the group of BBU's prior to initiating the cycling operation. For example, the system can determine, by the master device, whether any other BBU's among the group of BBU's undergoing a cycling operation (act 708). If a cycling operation is ongoing (act 710), the master device can instruct the requesting BBU or requesting ATS/PSU to delay the cycling operation for at least the duration of the ongoing cycling operation (act 712). In some embodiments, the system can determine a required period of time for the ongoing operation to conclude, and postpone the pending cycling operation upon completion of the ongoing operation. Alternatively, where the cycling operation is requested by a component (like the ATS/PSU), the system can deny the request while the requesting component continues to generate the request until the master device allows the request.

In some embodiments, as with process 500, the system in process 700 can perform additional checks on the backup power system prior to initiating the cycling operation, including but not limited to determining whether the subset of BBU's excluded from the request have sufficient capacity to handle the shared load absent the particular BBU for which the request was initiated (act 714). If the system detects that the capacity of the remaining BBU's would fall below a threshold capacity (act 716), the system can generate a report for presentation to a user and/or prevent the cycling operation (act 718). Similarly, the system can determine whether a BBU of the group has generated an exception (act 720). If an exception is detected (act 722), the system can generate a report indicating the failure and/or prevent the cycling operation (act 724). Once the system has verified the integrity of the backup power systems, the master device can initiate the cycling operation on the selected BBU (act 726).

Figure 8:
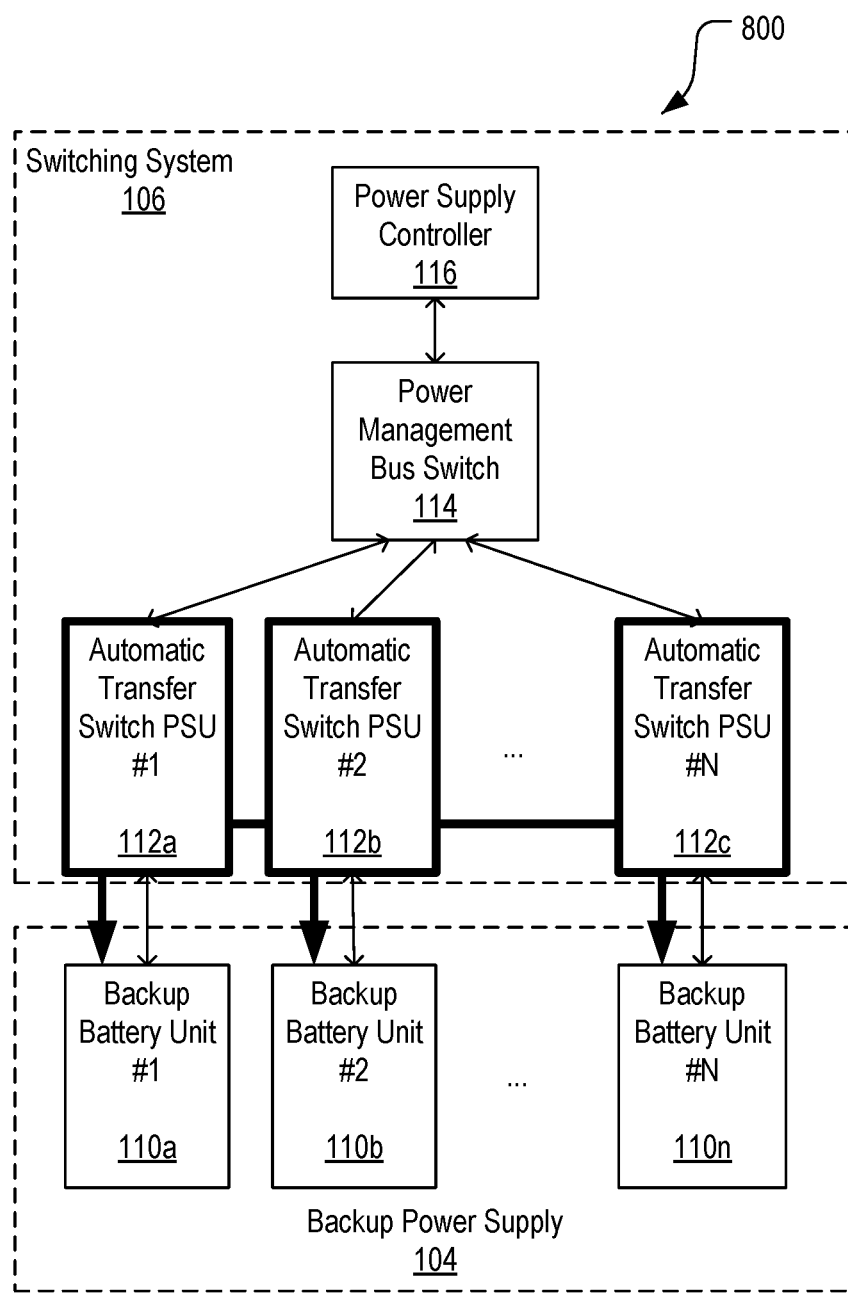
FIG. 8 is a block diagram illustrating a third approach to controlling a cycling operation on a BBU in a system like the systems of FIG. 1 or 2.

In both approaches detailed above with respect to FIGS. 4-7, authority to query the ATS/PSUs and BBU's, and to initiate, delay, or prevent a cycling operation, is assigned to a centralized controller, e.g. PSC 116 as described with reference to FIGS. 4-5, or a master device selected from among the ATS/PSUs as described with reference to FIGS. 6-7. Various embodiments can use any suitable centralized controller to manage cycling operations among the BBU's in a similar manner. However, in some alternative embodiments, control over BBU cycling operations may be decentralized or conducted under the direct control of the BBU's or their respective ATS/PSUs under an arbitration approach. For example, FIG. 8 is a block diagram illustrating a third approach to controlling a cycling operation on a BBU in a system like the systems of FIG. 1 or 2, in accordance with embodiments. In the system 800, each ATS/PSU among the set of ATS/PSUs controlling the group of BBU's can request permission to initiate a cycling operation from each other ATS/PSU or BBU among the group, and conflicts are handled by way of arbitration without necessitating a master device or centralized controller.

Figure 9:
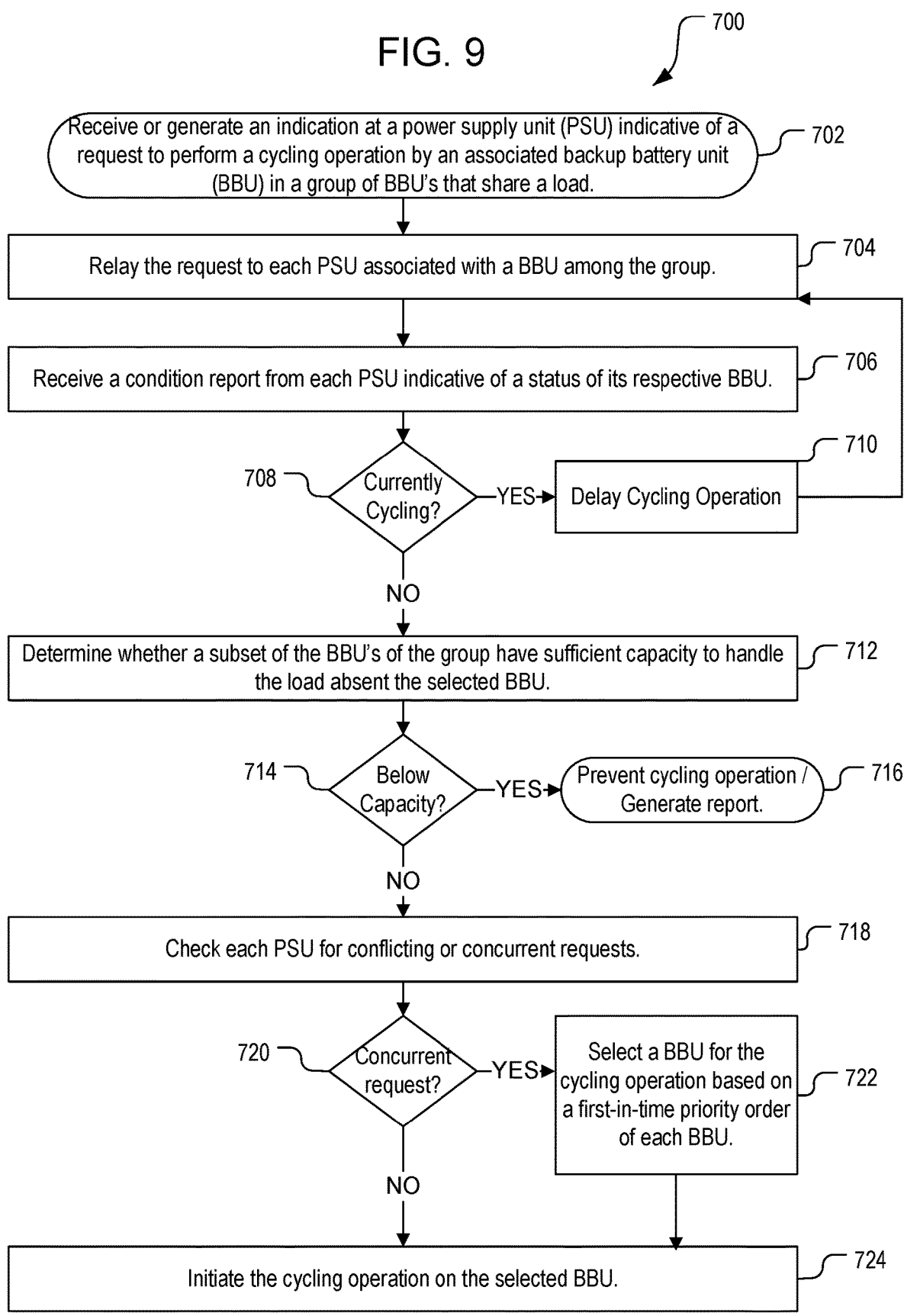
FIG. 9 is a detailed process for controlling a cycling operation on a BBU in accordance with the approach of FIG. 8.

FIG. 9 illustrates the process 900 for controlling a cycling operation on a BBU in accordance with the approach of FIG. 8, and in conjunction with the systems 100, 200 shown in FIGS. 1 and 2. In the process 900, an indication is received at an ATS/PSU indicative of a request to perform a cycling operation (e.g., a conditioning cycle, learning cycle, or the like,) on a BBU among a group of BBU's that share a common load (act 902). This request may originate with the ATS/PSU and/or from the associated BBU. In response to the request, the ATS/PSU polls each ATS/PSU associated with other BBU's among the group (act 904), and receives a condition report from each other ATS/PSU indicative of a status of its respective BBU (act 906). If any of the ATS/PSUs report that their BBU is currently engaged in a cycling operation (act 908), ATS/PSU will delay the pending cycling operation (910), and will continue to poll the ATS/PSUs for as long as the request is active.

If no cycling operation is currently being conducted at a different BBU, the ATS/PSU may, in some embodiments, compare a total capacity of the other BBU's with a threshold capacity to determine whether the requesting BBU can be taken offline without decreasing the total capacity below the threshold (act 912). If the remaining BBU's are below the threshold capacity (act 914) the requesting ATS/PSU can prevent the cycling operation, and may generate an error report indicative of a low capacity error. The ATS/PSU can also receive requests from other ATS/PSUs indicative of concurrent requests to perform a cycling operation (act 918). Concurrent requests can be handled by assigning a priority to each ATS/PSU, e.g. in firmware, which can prevent an ATS/PSU from initiating a cycling operation on a BBU when an ATS/PSU with a higher priority is concurrently processing a request for a cycling operation for its respective BBU. Thus, if concurrent requests are detected (act 920), the system allows only one ATS/PSU to authorize a cycling operation (e.g., conditioning cycle, learning cycle, or the like) at a time among the group of BBU's based on the priority of the respective ATS/PSU or BBU (act 922). In such cases, the BBU that is not selected to perform the cycling operation can continue to request the cycling operation, and may be authorized after the completion of the authorized cycling operation; while the authorized cycling operation is initiated on the selected BBU (act 924).

According to some embodiments, each ATS/PSU may be configured to also query whether any BBU's have generated an exception, e.g. failed or operated outside of a prescribed range of temperatures, voltages, or other high-risk or failure criterion, prevent cycling operations from occurring when an exception has been detected, and generate errors for signaling such failures to a user. Priority assignment for each ATS/PSU or BBU may be predefined, e.g. by rack position, by assignment in firmware, by a randomly generated number or serial number, or other criteria. In some cases, priority assignment may be defined based on an order in which the requests are received. In some embodiments, arbitration can be performed by use of an analog line, e.g. under a GPL protocol. For example, for a high-enabled analog line, the first BBU that pulls up the signal line to high receives priority for the cycling operation, which may be a learning or conditioning cycle. This architecture only requires one general-purpose input/output (GPIO) port, whereas alternative approaches may require two lines on a digital communication bus.

As described above, further detection steps may be conducted in conjunction with a decentralized process like processes 500, 700, and 900. For example, In addition, for some systems, the capacity of the backup power systems may remain adequate to power their load even when two or more BBU's are taken offline. In such cases, methods may be modified to detect when two or more BBU's are performing a cycling operation rather than one; or may skip the process step of detecting cycling operations entirely in favor of determining whether remaining capacity is adequate.

Figure 10:
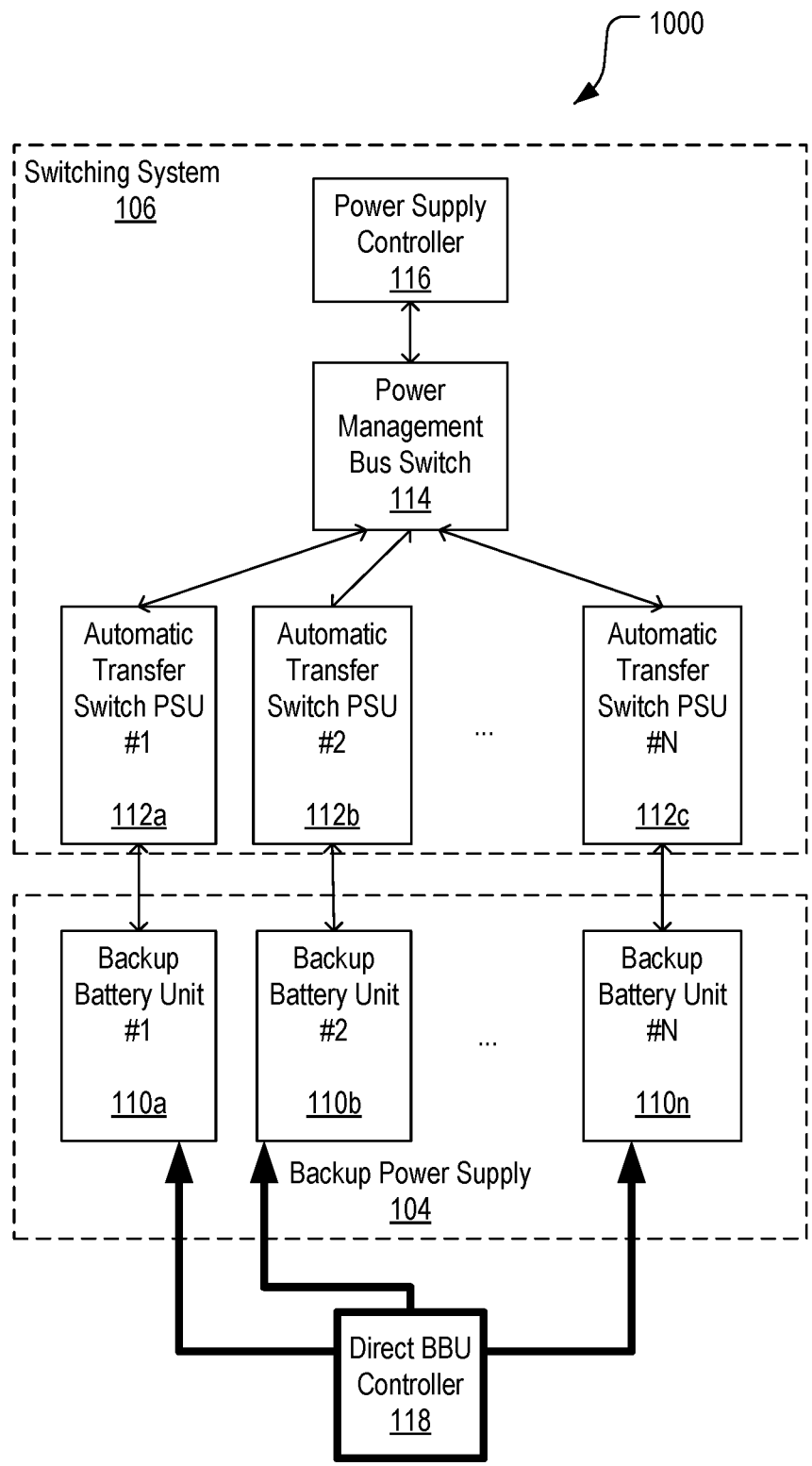
FIG. 10 is a block diagram of an example system for controlling cycling operations on a BBU where a controller communicates directly with the BBU.

As discussed above with reference to FIGS. 4 and 6, and according to various embodiments, instructions for initiating, delaying, or preventing cycling operations at a BBU can be generated at a controller (e.g. a power supply/power shelf controller 116 or a master device 112*a*), and relayed to the BBU devices via one or more intermediary components, such as a bus switch 114, power supply unit 112, or the like. However, in some embodiments, a controller may be operably connected directly with one or more BBU's. For example, FIG. 10 is a block diagram of an example system 1000 for controlling cycling operations on BBU's where a direct BBU controller 118 communicates directly with one or more BBU's. The system 1000 can implement any suitable process for BBU management as discussed above, e.g. as described in FIGS. 3, 5, 7, or in any other process disclosed herein, under the control of the direct BBU controller 118.

Figure 11:
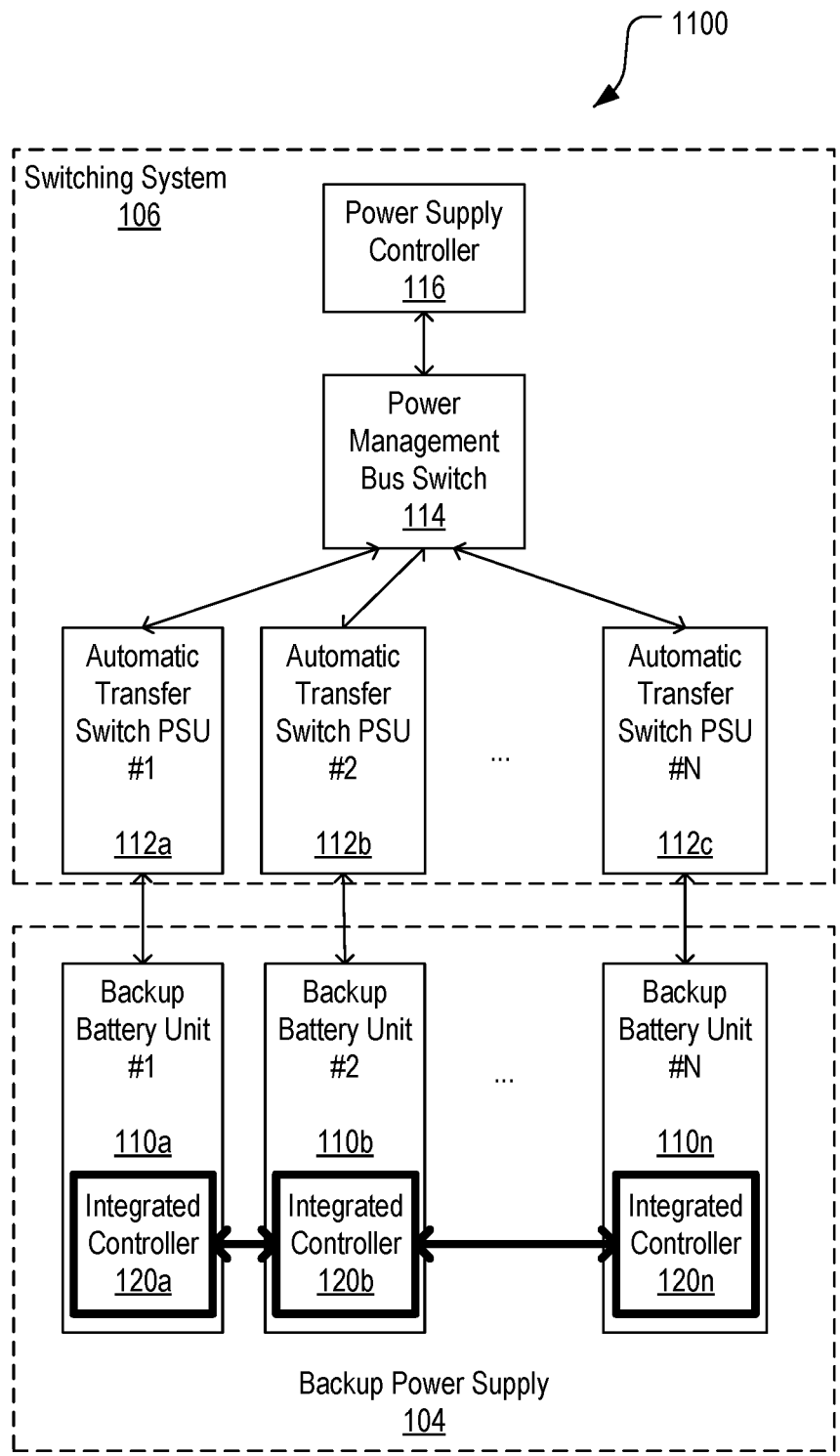
FIG. 11 is a block diagram of an example system for controlling cycling operations on a BBU where BBU-integrated controllers communicate with each other.

As discussed above with reference to FIG. 8, and according to various embodiments, instructions for initiating, delaying, or preventing cycling operations can be generated as part of an arbitration method between the associated PSU's or BBU's, without relying on a centralized controller. However, in some embodiments, controllers may be integrated with the BBU's directly and perform any of the above-described arbitration steps without passing through an intermediary such as a PSU. For example, FIG. 11 is a block diagram of an example system 1100 for controlling cycling operations on BBU's 112 where BBU-integrated controllers 120*a*, 120*b*, 120*n* communicate with each other directly. Such controllers 120 can detect and/or store information about the status of their respective BBU's 110, e.g. charge information, schedules for cycling operations, etc., and generate requests to perform a cycling operation. The system 1100 can implement any suitable process for BBU management without a centralized controller, e.g. as described with reference to FIG. 9, or in any other suitable process disclosed herein, under the control of an arbitration process managed by the BBU-integrated controllers 120.

Figure 12:
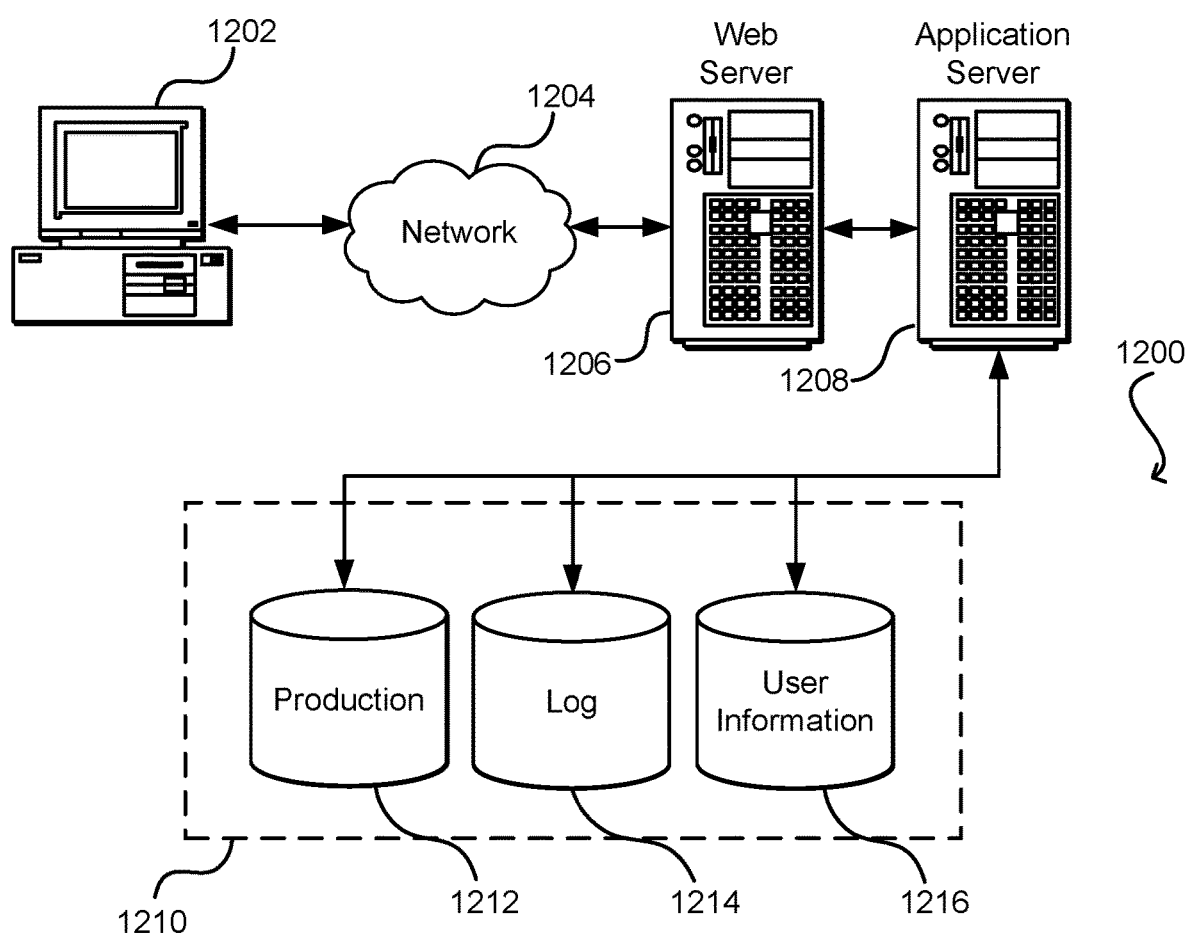
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for controlling cycling operations of backup battery units configured to supply backup electrical power to electronic components in a datacenter, the system comprising:

electronic components having a power demand;

backup battery units configured to supply backup electrical power to the electronic components;

power supply units configured to supply electrical power to the electronic components, each of the power supply units being configured to switch between receiving electrical power from a primary power supply and a respective one of the backup battery units; and a controller comprising a processor and memory containing executable instructions that, when executed by the processor, cause the controller to:

receive a request to cause a selected backup battery unit of the backup battery units to undergo a cycling operation;

receive information indicative of a total power capacity of a remaining set of the backup battery units not including the selected backup battery unit;

determine the total power capacity of the remaining set of the backup battery units based on the information;

compare the total power capacity of the remaining set of the backup battery units to a threshold, the threshold being based on the power demand of the electronic components over a predetermined period of time; and prevent the selected backup battery unit from initiating the cycling operation in response to determining that the total power capacity is below the threshold.

2. The system of claim 1, wherein the executable instructions are further configured to cause the controller to:

query a subset of the power supply units associated with the remaining set of the backup battery units to determine whether any one of the remaining set of the backup battery units is offline; and prevent the selected backup battery unit from undergoing the cycling operation in response to a determination that any one of the remaining set of the backup battery units is offline.

3. The system of claim 1, wherein the executable instructions are further configured to cause the controller to:

query a subset of the power supply units associated with the remaining set of the backup battery units to determine whether any one of the remaining set of the backup battery units has generated an exception; and prevent the selected backup battery unit from undergoing the cycling operation in response to a determination that any one of the remaining set of the backup battery units has generated an exception.

4. The system of claim 1, wherein the executable instructions are further configured to cause the controller to:

determine the total power capacity of the remaining set of the backup battery units by summing respective power capacities of the remaining set of the backup battery units; and cause the selected backup battery unit to undergo the cycling operation in response to determining that the total power capacity of the remaining set of the backup battery units exceeds the threshold.

5. The system of claim 1, wherein:

the backup battery units comprise six backup battery units; and when each of the six battery backup units is in a new condition and fully charged, a total power capacity of any five of the six battery backup units meets or exceeds the power demand.

6. The system of claim 1, wherein:

the threshold is set to meet or exceed the power demand of the electronic components over a predetermined duration;

the threshold is at least 2 kw; and the predetermined duration is at least 3 minutes.

7. A method, comprising:

receiving a request to cause a selected backup battery unit of a plurality of backup battery units to undergo a cycling operation, wherein the plurality of battery backup units are configured to supply backup electrical power to an electronic device;

determining whether a remaining set of the backup battery units has a total power capacity sufficient to satisfy a power demand associated with the electronic device, wherein the remaining set of the backup battery units does not include the selected battery backup unit; and preventing, via a power supply unit operatively coupled with the selected battery backup unit, first selected backup battery unit from undergoing the cycling operation in response to a determination that the total power capacity is not sufficient to satisfy the power demand.

8. The method of claim 7, wherein the cycling operation comprises a learning cycle or a conditioning cycle.

9. The method of claim 7, further comprising:

detecting whether any of the remaining set of the backup battery units is undergoing a cycling operation; and preventing, via the power supply unit associated with the first selected backup battery unit, the selected backup battery unit from undergoing the cycling operation in response to detecting that any of the remaining set of the backup battery units is undergoing a cycling operation.

10. The method of claim 9, further comprising:

instructing the power supply unit associated with the selected backup battery unit to prevent the selected backup battery unit from undergoing the cycling operation while any of the remaining set of the backup battery units is undergoing a cycling operation.

11. The method of claim 7, further comprising:

detecting whether any backup battery unit of the remaining set of the backup battery units has generated an exception; and causing the power supply unit associated with the selected backup battery unit to prevent the selected backup battery unit from undergoing the cycling operation in response to detecting that a backup battery unit of the remaining set of the backup battery units has generated the exception.

12. The method of claim 7, further comprising:

selecting a master device from among power supply units configured to supply electrical power to the electronic device; and querying the remaining set of the backup battery units by the master device to determine a status of each backup battery unit of the remaining set of the battery backup units.

13. The method of claim 7, further comprising:

providing a controller configured to communicate with each of power supply units configured to supply electrical power to the electronic device; and querying the remaining set of the backup battery units by the controller to determine a status of each backup battery unit of the remaining set of the battery backup units.

14. The method of claim 7, wherein:

the request to cause the selected backup battery unit to undergo the cycling operation is received by a selected power supply unit associated with the selected backup battery unit; and the selected power supply unit queries other power supply units associated with the remaining set of the backup battery units to determine a status of each backup battery unit of the remaining set of the backup battery units.

15. The method of claim 14, further comprising:

receiving a second request to cause a second selected backup battery unit of the remainder remaining set of the backup battery units to undergo a second cycling operation; and preventing the second backup battery unit from undergoing the second cycling operation in response to the second request being received after the request to cause the selected backup battery unit to undergo the cycling operation.

16. A system, comprising:

a controller comprising a processor and memory containing executable instructions that, when executed by the processor, cause the controller to:

receive a request to cause a selected backup battery unit to undergo a cycling operation, wherein backup battery units configured to supply electrical power to a shared power demand comprise the selected backup battery unit;

determine whether a remaining set of the backup battery units can supply sufficient power to meet or exceed the shared power demand, wherein the remaining set of the backup battery units does not include the selected backup battery unit; and prevent the selected backup battery unit from undergoing the cycling operation in response to determining that the remaining set of the backup battery units cannot supply sufficient power to satisfy the shared power demand.

17. The system of claim 16, wherein:

each of the backup battery units is operably connected with a respective power supply unit for supplying power to and receiving power from the backup battery unit;

the controller comprises a power management controller; and the executable instructions are further configured to cause the power management controller to communicate with each of the power supply units via a common bus.

18. The system of claim 16, wherein:

each of the backup battery units is operably connected with a respective power supply unit for supplying power to and receiving power from the backup battery unit; and the controller is configured to query a master device selected from among the power supply units to determine a status of each backup battery unit of the remaining set of the battery backup units.

19. The system of claim 16, wherein:

each of the backup battery units is operably connected with a respective power supply unit for supplying power to and receiving power from the backup battery unit; and the controller is configured to query a controlling power supply unit temporarily selected from among the power supply units to determine a status of each backup battery unit of the remaining set of the battery backup units, the controlling power supply unit corresponding to the selected backup battery unit.

20. The system of claim 16, wherein a total power capacity of the backup battery units exceeds the shared power demand by at least an amount corresponding to a first capacity of one of the backup battery units, such that a subset of the backup battery units can provide power equal to or exceeding the shared power demand when one or more of the backup battery units are taken offline.

* * * * *

UNITED STATES PATENT AND TRADEMARK OFFICE
CERTIFICATE OF CORRECTION

PATENT NO. : 10,725,514 B1
APPLICATION NO. : 15/831118
DATED : July 28, 2020
INVENTOR(S) : Ligong Wang and Darin Lee Frink Page 1 of 1

It is certified that error appears in the above-identified patent and that said Letters Patent is hereby corrected as shown below:

In the Claims

Column 15, Line 64, Claim 7:
Delete: "with the selected battery backup unit, first selected"
Insert: --with the selected battery backup unit, selected--

Column 16, Line 7, Claim 9:
Delete: "first selected backup battery unit, the selected backup"
Insert: --selected backup battery unit, the selected backup--

Column 16, Line 56, Claim 15:
Delete: "backup battery unit of the remainder remaining set of"
Insert: --backup battery unit of the remaining set of--

Signed and Sealed this
Tenth Day of November, 2020

Andrei Iancu
*Director of the United States Patent and Trademark Office*